US011811094B2

United States Patent
Yanagida et al.

(10) Patent No.: US 11,811,094 B2
(45) Date of Patent: Nov. 7, 2023

(54) WIRING MODULE

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP); TOYOTA JIDOSHA KABUSHIKI KAISHA, Aichi (JP)

(72) Inventors: Taiji Yanagida, Mie (JP); Hiroki Shimoda, Mie (JP); Yoshinori Ito, Mie (JP); Takehito Yoda, Aichi (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP); TOYOTA JIDOSHA KABUSHIKI KAISHA, Aichi (JP)

( * ) Notice: Subject to any disclaimer, the term of this patent is extended or adjusted under 35 U.S.C. 154(b) by 576 days.

(21) Appl. No.: 17/057,907

(22) PCT Filed: May 23, 2019

(86) PCT No.: PCT/JP2019/020384
§ 371 (c)(1),
(2) Date: Nov. 23, 2020

(87) PCT Pub. No.: WO2019/230542
PCT Pub. Date: Dec. 5, 2019

(65) Prior Publication Data
US 2021/0210822 A1    Jul. 8, 2021

(30) Foreign Application Priority Data
Jun. 1, 2018    (JP) .................................. 2018-106029

(51) Int. Cl.
*H01M 50/507*    (2021.01)
*H01M 50/503*    (2021.01)
(Continued)

(52) U.S. Cl.
CPC ....... *H01M 50/507* (2021.01); *H01M 50/209* (2021.01); *H01M 50/298* (2021.01);
(Continued)

(58) Field of Classification Search
CPC ............. H01M 50/507; H01M 50/503; H01M 50/209; H01M 50/298; H01M 50/50;
(Continued)

(56) References Cited

U.S. PATENT DOCUMENTS 9,601,743 B2 *   3/2017   Ogasawara ......... H01M 50/298
10,020,484 B2 *  7/2018   Nakayama .......... H01M 50/503
(Continued)

FOREIGN PATENT DOCUMENTS

JP    2011-076936    4/2011
JP    2013-54997     3/2013
(Continued)

OTHER PUBLICATIONS

International Search Report (ISR) issued in International Patent Application No. PCT/JP2019/020384, dated Aug. 27, 2019, along with an English translation thereof.
(Continued)

*Primary Examiner* — Briggitte R. Hammond
(74) *Attorney, Agent, or Firm* — GREENBLUM & BERNSTEIN, P.L.C.

(57) ABSTRACT

A wiring module includes a first housing section row, a second housing section row, and linking sections. The first housing section row includes first housing sections that are arranged in an arrangement direction and include connection bus bars therein, respectively. The second housing section
(Continued)

row includes second housing sections that are arranged in the arrangement direction and include the connection bus bars and output bus bars therein, respectively, and is disposed away from the first housing section row with respect to a crossing direction that crosses the arrangement direction. The linking sections are disposed between the first and second housing section rows and link the first and second housing section rows. The first housing sections are connected by a first warping section that can be deformed with warping and the second housing sections are connected by a second warping section that can be deformed with warping.

6 Claims, 8 Drawing Sheets

(51) Int. Cl.
| | | |
|---|---|---|
| *H01R 11/01* | (2006.01) | |
| *H01M 50/50* | (2021.01) | |
| *H01M 50/298* | (2021.01) | |
| *H01M 50/209* | (2021.01) | |
| *H01R 11/09* | (2006.01) | |

(52) U.S. Cl.
CPC ......... *H01M 50/50* (2021.01); *H01M 50/503* (2021.01); *H01R 11/01* (2013.01); *H01R 11/09* (2013.01)

(58) Field of Classification Search
CPC . H01M 2220/20; H01M 50/249; H01R 11/01; H01R 11/09; Y02T 10/70; H01G 11/76; H01G 11/82; H01G 11/72; H01G 11/10; Y02E 60/10
See application file for complete search history.

(56) References Cited

U.S. PATENT DOCUMENTS

| | | | |
|---|---|---|---|
| 11,322,802 B2* | 5/2022 | Yanagida | H01M 10/4207 |
| 2002/0102457 A1* | 8/2002 | Oogami | H01M 10/625 |
| | | | 180/68.5 |
| 2011/0076521 A1 | 3/2011 | Shimizu et al. | |
| 2014/0370342 A1* | 12/2014 | Nakayama | H01M 10/48 |
| | | | 429/90 |
| 2021/0098848 A1* | 4/2021 | Takase | H01M 50/505 |

FOREIGN PATENT DOCUMENTS

| | | |
|---|---|---|
| JP | 2014-049238 | 3/2014 |
| JP | 2015-159024 | 9/2015 |

OTHER PUBLICATIONS

Written Opinion (WO) issued in International Patent Application No. PCT/JP2019/020384, dated Aug. 27, 2019, along with an English translation thereof.

* cited by examiner

WIRING MODULE

TECHNICAL FIELD

The technology disclosed herein relates to a wiring module.

BACKGROUND ART

A wiring module that is to be mounted on a power storage element group and described in Japanese Unexamined Patent Application Publication No. 2014-49238 has been known. The power storage element group includes power storage elements that include electrode terminals and are arranged. The wiring module includes a first-group accommodation part, a second-group accommodation part, and a linkage part. The first-group accommodation part includes accommodation parts accommodating bus bars and the second-group accommodation part includes accommodation parts accommodating bus bars. The linkage part links the first-group accommodation part and the second-group accommodation part.

RELATED ART DOCUMENT

Patent Document

[Patent Document 1] Japanese Unexamined Patent Application Publication No. 2014-49238

SUMMARY OF THE INVENTION

Problem to be Solved by the Invention

However, in the above-described technology, the linkage part liking the accommodation part of the first-group accommodation part and the accommodation part of the second-group accommodation part is made of synthetic resin integrally with the accommodation parts and is linearly disposed. As a result, the wiring module according to the related art is less likely to be deformed with warping as a whole in a direction crossing a direction in which the accommodation parts are arranged. Therefore, it was difficult to connect each of the electrode terminals to each bus bar independently as will be described below.

When one of the bus bars is connected to one of the electrode terminals, the accommodation part accommodating the one bus bar tries to approach an electrode surface. However, other accommodation parts accommodating the bus bars that are not connected to the electrode terminals stay in positions spaced away from the electrode surfaces. The wiring module that is less likely to be deformed with warping in the direction crossing the electrode surface is forced to stay in the position spaced away from the electrode surfaces as a whole as long as the bus bars include one that is not connected to the electrode terminal. Therefore, in the wiring module of the related art, the bus bars that are included in the wiring module are attached to the power storage element group at the same time. This lowers performing efficiency of attaching the wiring module to the power storage element group.

The technology described herein was made in view of the above circumstances. An object is to provide a wiring module that improves performing efficiency of attaching the wiring module to the power storage element group.

Means for Solving the Problem

The technology described herein is related to a wiring module to be mounted on a power storage element group including power storage elements that are arranged in an arrangement direction and have electrode surfaces having electrode terminals thereon. The wiring module includes bus bars each of which is connected to at least one of the electrode terminals, a first housing section row, a second housing section row, and linking sections. The first housing section row includes first housing sections that are arranged in the arrangement direction and include the bus bars therein, respectively. The second housing section row includes second housing sections that are arranged in the arrangement direction and include the bus bars therein, respectively, and the second housing section row is disposed away from the first housing section row with respect to a crossing direction that crosses the arrangement direction. The linking sections are disposed between the first housing section row and the second housing section row and link the first housing section row and the second housing section row. The first housing sections are connected by a first warping section that can be deformed with warping and the second housing sections are connected by a second warping section that can be deformed with warping. Each of the linking sections includes a deformation portion that can be deformed with twisting.

According to the above configuration, the first warping section is deformed with warping such that the first housing section row can be warped in the direction crossing the electrode surface of the power storage element. The second warping section is deformed with warping such that the second housing section row can be warped in the direction crossing the electrode surface of the power storage element. The deformation portion of the linking section is deformed with twisting such that the warping deformation of the first housing section row and the warping deformation of the second housing section row do not interfere with each other. Accordingly, the wiring module can be easily deformed with warping as a whole in the direction crossing the electrode surface.

Embodiments of the technology described herein may preferably include configurations as follows.

The deformation portion may be contracted and expand in the crossing direction.

According to the above configuration, the deformation portion is contracted or expand in the crossing direction to deal with tolerance for a distance between the first housing section row and the second housing section row.

Each of the bus bars may include three or more connection sections that are to be connected to the electrode terminals.

The bus bars each of which includes three or more connection sections are longer than a bus bar including two connection sections with respect to the arrangement direction. Since the bus bars are made of metal, the bus bars cannot be warped in the direction crossing the electrode surface. Therefore, with the configuration in which the wiring module includes the bus bars each of which includes three or more connection sections, the wiring module is hardly warped in the direction crossing the electrode surface. The present invention is particularly effective for such a configuration.

A position of one first housing section of the first housing sections may be shifted from a position of one second housing section of the second housing sections with respect to the arrangement direction and the one second housing section may be adjacent to the one first housing sections in the crossing direction.

According to the above configuration, the position where the one first housing section is to be deformed with warping in the direction crossing the electrode surface and the position where the one second housing section is to be deformed with warping in the direction crossing the electrode surface are shifted from each other with respect to the arrangement direction. The wiring module may be less likely to be deformed with warping as a whole in the direction crossing the electrode surface. According to the technology described herein, the wiring module can be easily deformed with warping as a whole in the direction crossing the electrode surface.

Each of the linking sections may include an in-between routing section in which an electric wire is routed.

According to the above configuration, since the electric wire is routed in the in-between routing section, the electric wire can be routed in both of the first housing section row and the second housing section row. This allows the electric wire to be routed more freely in the wiring module.

Each of the linking sections may include a wire stopper portion that holds the electric wire to suppress the electric wire from going out from the in-between routing section.

According to the above-described configuration, the electric wire is less likely to go out from the in-between routing section. The linking section can be deformed with twisting at the deformation portion and this may let the electric wire go out more easily. Therefore, the above configuration is particularly effective.

Advantageous Effects of Invention

According to the technology disclosed herein, performing efficiency of attaching the wiring module to the power storage element group is improved.

MODES FOR CARRYING OUT THE INVENTION

First Embodiment

A first embodiment of the technology disclosed herein will be described with reference to FIGS. 1 to 8. A wiring module 10 according to this embodiment is attached to a power storage element group 12 including power storage elements 11 (twenty four power storage elements 11 in this embodiment) that are arranged in a left-right direction (one example of an arrangement direction) to configure a power storage module 13 (refer to FIG. 8). The power storage module 13 is installed in a vehicle (not illustrated) such as an electric vehicle and a hybrid vehicle and used as a power source for driving the vehicle. In the following description, a Z-direction corresponds to an upper side, a Y-direction corresponds to a front side, and an X-direction corresponds to a left side. For components having the same configuration, some of the components may be indicated by reference signs and the rest of the components may not be indicated by the reference signs.

Power Storage Element 11

Figure 3:
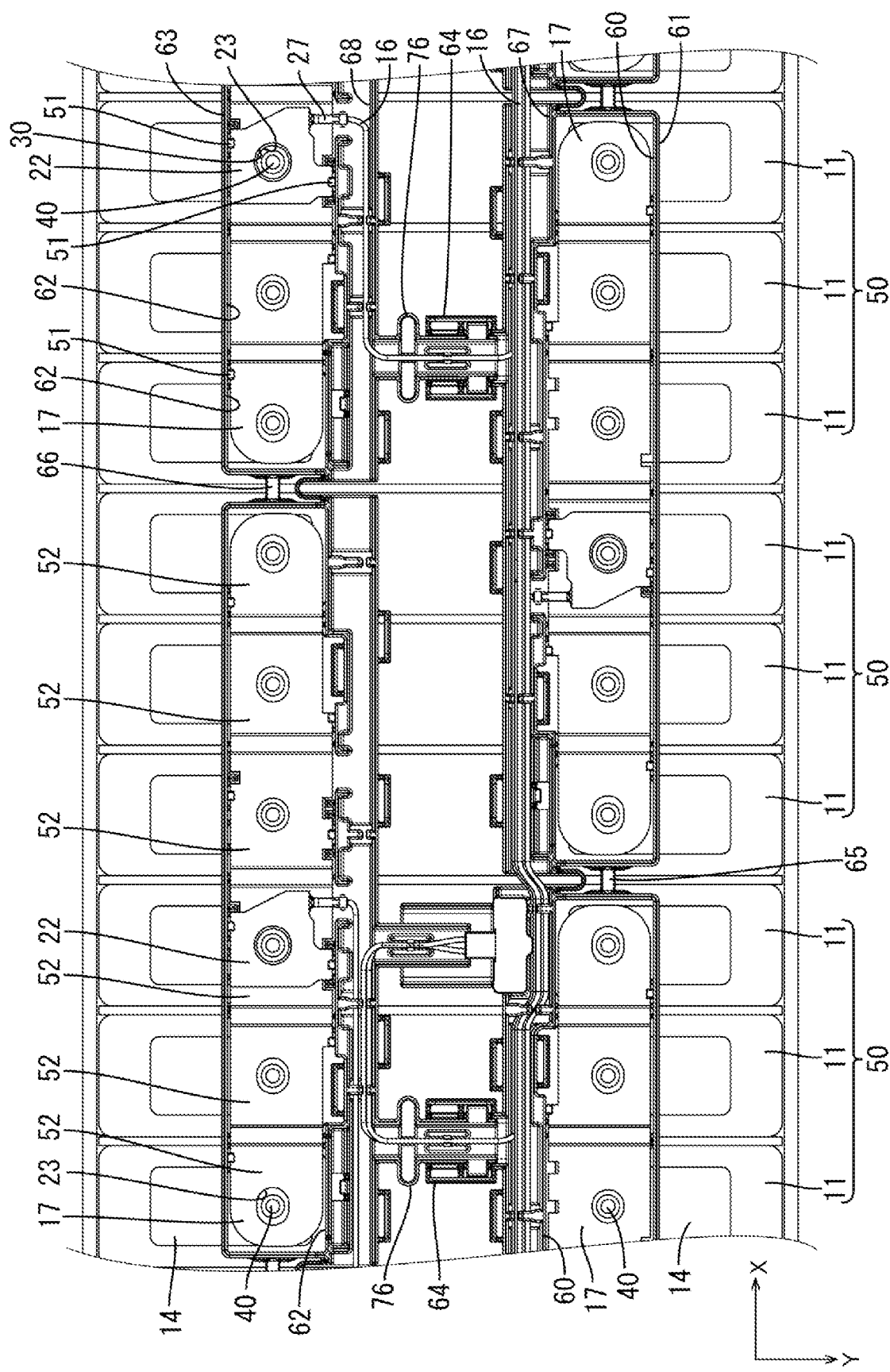
FIG. 3 is an enlarged plan view illustrating a portion of the wiring module.

The power storage element 11 in this embodiment is a secondary battery. The power storage element 11 includes therein a power storage component, which is not illustrated. The power storage element 11 has a rectangular parallelepiped shape. As illustrated in FIG. 3, the power storage element 11 includes a pair of electrode terminals 14 on two end portions of an upper surface with respect to a front-rear direction (one example of a crossing direction), respectively. One of the electrode terminals 14 is an anode terminal and another one is a cathode terminal. In this embodiment, the upper surface of the power storage element 11 corresponds to an electrode surface 41 where the pair of electrode terminals 14 is disposed (refer to FIG. 8).

The power storage element group 12 includes groups 50 of power storage elements 11 that are arranged in the left-right direction. Each of the groups 50 includes three power storage elements 11 arranged such that the adjacent electrode terminals 14 have the same polarity. The groups 50 of the power storage elements 11 are arranged such that the adjacent electrode terminals 14 included in the adjacent groups 50 of the power storage elements 11, respectively, have different polarities. For example, when the anode terminals are on the front side and the cathode terminals are on the rear side in one of the two adjacent groups 50 of the power storage elements 11, the cathode terminals are on the front side and the anode terminals are on the rear side in another one of the two adjacent groups 50 of the power storage elements 11.

Figure 8:
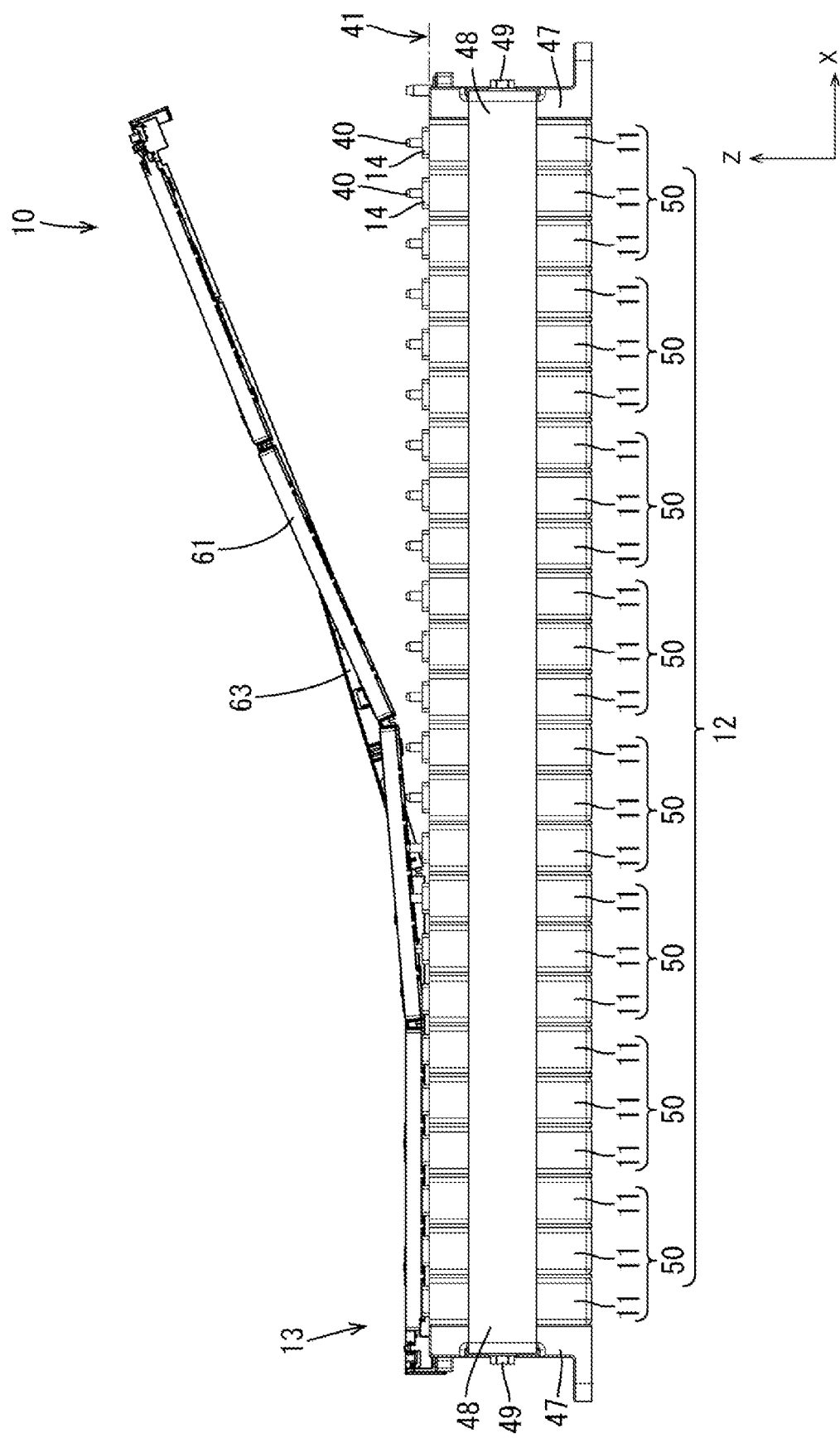
FIG. 8 is a side view illustrating the wiring module that is attached to the power storage element group.

As illustrated in FIG. 8, two end plates 47, 47 are disposed on left and right end portions of the power storage element group 12, respectively. The end plates 47, 47 are sandwiched by two holding plates 48, 48 that are disposed on a front side surface and a rear side surface of the power storage element group 12, respectively, and fixed to the end plates 47, 47 with bolts 49.

Wiring Module 10

As illustrated in FIG. 3, the wiring module 10 is mounted on an upper surface of the power storage element group 12. The wiring module 10 has a narrow elongated shape extending in the left-right direction as a whole.

Figure 1:
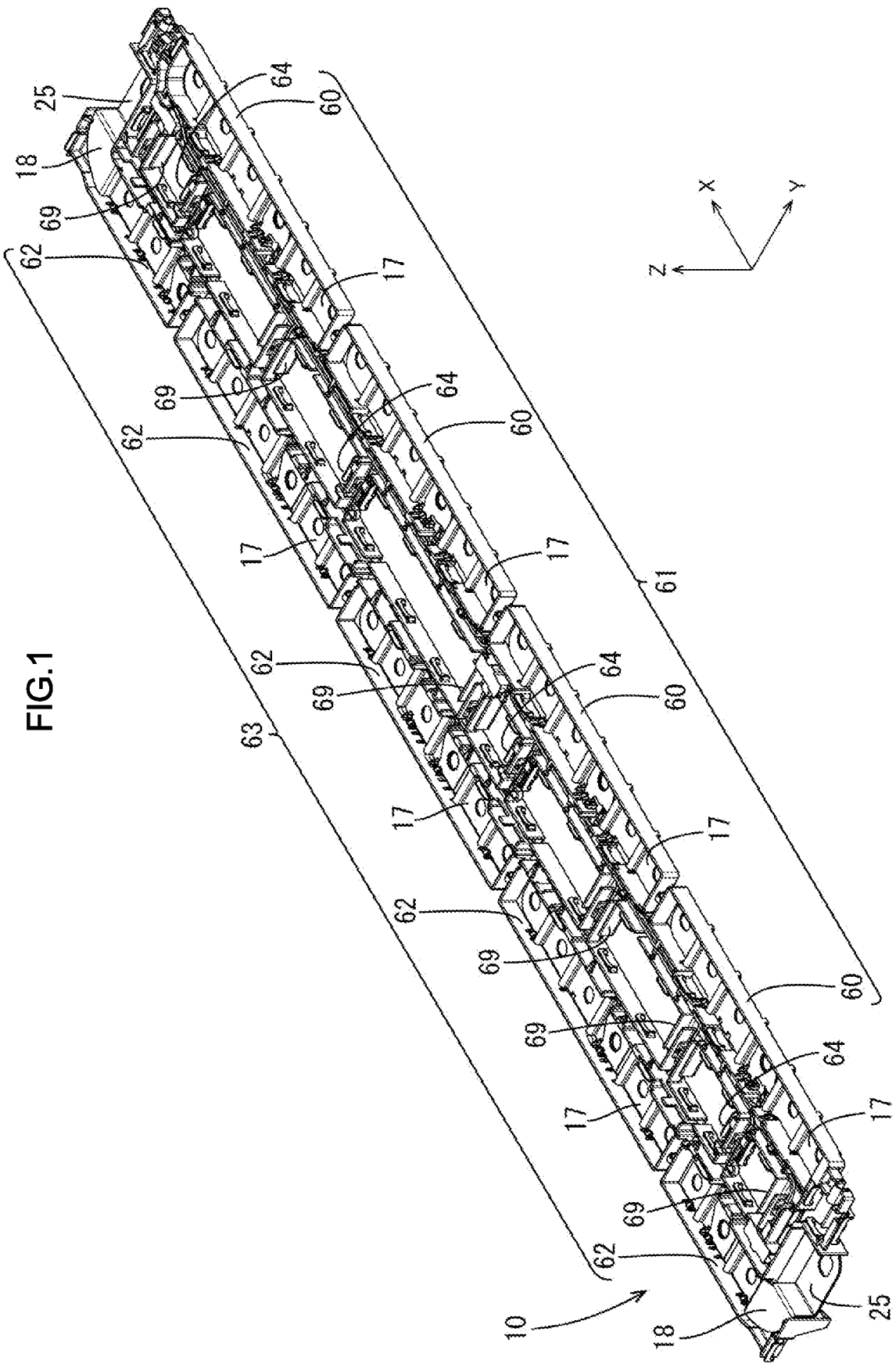
FIG. 1 is a perspective view illustrating a wiring module according to a first embodiment.
Figure 2:
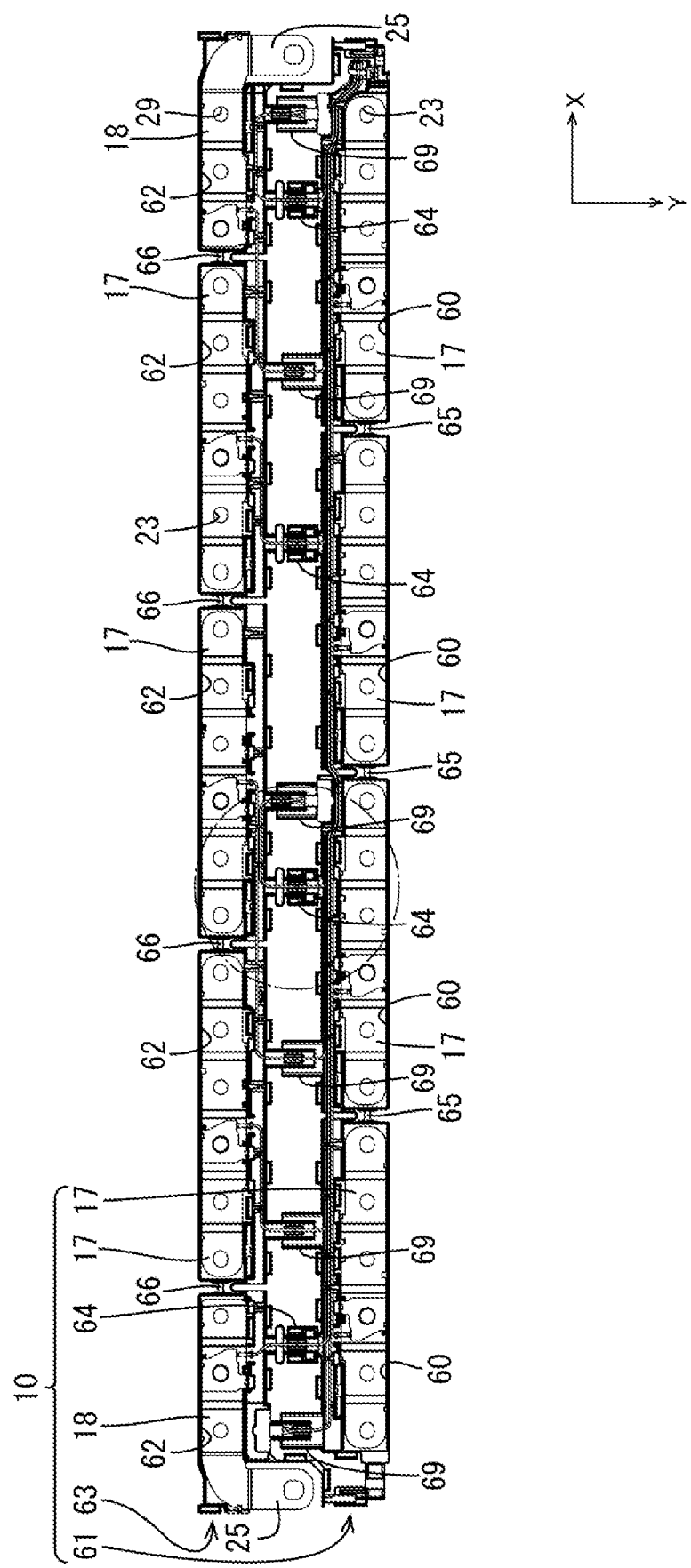
FIG. 2 is a plan view illustrating the wiring module.

As illustrated in FIGS. 1 and 2, the wiring module 10 includes connection bus bars 17 (one example of bus bars), output bus bars 18 (one example of the bus bars), a first housing section row 61, a second housing section row 63, and linking sections 64 (four linking sections 64 in this embodiment). The first housing section row 61 includes first housing sections 60 (four first housing sections 60 in this embodiment) that are arranged in the left-right direction. The second housing section row 63 includes second housing sections (five second housing sections 62 in this embodiment) that are arranged in the left-right direction. The first housing section row 61 and the second housing section row 63 are linked to each other by the linking sections 64.

First Housing Section Row 61

The first housing section row 61 includes the first housing sections 60 (four first housing sections 60 in this embodiment) that are made of insulating synthetic resin and connected to each other by first warping sections 65. Each of the first housing sections 60 has a box shape opening upward. The first housing section 60 includes stopper projections 51 on an inner wall thereof and the stopper projections 51 hold the connection bus bar 17 from the above and the connection bus bar 17 is arranged in the first housing section 60 so as not to be dropped therefrom. The connection bus bar 17 has a narrow rectangular shape elongated in the left-right direction seen from the above. The first housing section 60 has a shape that is slightly greater than that of the connection bus bar 17.

The first warping section 65 has a plate shape and is integrally formed with each of the first housing sections 60. The first warping section 65 is elastically deformable and is elastically deformed to adjust a space between the adjacent first housing sections 60. The first warping sections 65 are elastically deformed and the first housing section row 61 can be warped as a whole in the direction crossing the electrode surface 41.

Second Housing Section Row 63

The second housing section row 63 includes second housing sections 62 (five second housing sections 62 in this embodiment) that are made of insulating synthetic resin and connected to each other by second warping sections 66. The second housing section row 63 is disposed away from the first housing section row 61 with respect to the front-rear direction (one example of a direction crossing the arrangement direction).

The output bus bar 18 is arranged in each of the second housing sections 62 that are disposed in left and right end portions of the second housing section row 63, respectively. The output bus bar 18 is bent in an L-shape seen from the above. The connection bus bar 17 is arranged in each of the three second housing sections 62 of the second housing section row 63 except for the left and right end ones. The second housing section 62 has a box shape opening upward. The second housing sections 62 include the stopper projections 51 on inner walls thereof and the stopper projections 51 hold the connection bus bar 17 and the output bus bar 18 from the above and the connection bus bar 17 and the output bus bar 18 are arranged in the respective second housing sections 62 so as not to be dropped therefrom.

The second warping section 66 has a plate shape and is integrally formed with each of the second housing sections 62. The second warping section 66 is elastically deformable and is elastically deformed to adjust a space between the adjacent second housing sections 62. The second warping sections 66 are elastically deformed and the second housing section row 63 can be warped as a whole in the direction crossing the electrode surface 41.

Connection Bus Bar 17

As illustrated in FIG. 3, the connection bus bar 17 is formed by pressing a metal plate in a predefined shape. Metal for the metal plate may be selected as needed from copper, copper alloy, iron, iron alloy, aluminum, and aluminum alloy, for example. The connection bus bar 17 has a narrow and long shape elongated in the left-right direction seen from the above.

As illustrated in FIG. 3, the connection bus bar 17 includes through holes 23 (six through holes 23 in this embodiment) that extend through the connection bus bar 17 and stud bolts 40 having threads thereon are inserted through the through holes 23. The through holes 23 are arranged in a row along the left-right direction. Nuts, which are not illustrated, are screwed to the stud bolts 40 that are inserted through the respective through holes 23. Accordingly, the connection bus bar 17 is sandwiched between the nut and the electrode terminal 14 such that the electrode terminal 14 and the connection bus bar 17 are electrically connected. Surrounding areas around the through holes 23 are connection sections 52 that are to be electrically connected to the respective electrode terminals 14. The connection bus bar 17 includes six connection sections 52.

According to the above structure, the group 50 of the three power storage elements 11 that are connected in parallel and the adjacent group 50 of the three power storage elements 11 that are connected in parallel are connected in series by the connection bus bars 17.

Output Bus Bar 18

As illustrated in FIG. 2, the output bus bar 18 includes through holes 29 (four through holes 29 in this embodiment) that extend through the output bus bar 18 and stud bolts 40 are inserted through the through holes 29. The output bus bar 18 includes three connection sections 52 that are electrically connected to the electrode terminals 14, respectively. The output bus bar 18 includes an external terminal 25 on an end portion that is curved frontward. The external terminal 25 electrically connects an external circuit and the power storage element group 12.

In the first housing sections 60 and the second housing sections 62, voltage detection terminals 22 are disposed on the connection bus bars 17 and the output bus bars 18, respectively. The voltage detection terminal 22 is held by the stopper projection 51 from the above so as not to be dropped therefrom toward the upper side.

Voltage Detection Terminal 22

As illustrated in FIG. 3, the voltage detection terminal 22 is formed by pressing a metal plate in a predefined shape. Metal for the metal plate may be selected as needed from copper, copper alloy, iron, iron alloy, aluminum, and aluminum alloy, for example.

The voltage detection terminal 22 includes a through hole 30 through which a stud bolt 40 is inserted. The voltage detection terminal 22 is sandwiched between the nut and one of the connection bus bar 17 and the output bus bar 18 so as to be electrically connected to the electrode terminal 14.

The voltage detection terminal 22 includes a barrel portion 27 that is crimped to one end portion of a voltage detection wire 16 (one example of an electric wire). Another end portion of the voltage detection wire 16 is connected to an external connection device (not illustrated) such as an electronic control unit (ECU).

The ECU includes a microcomputer and elements and has a known configuration for detecting voltages, currents, and temperatures of the power storage elements 11 and controlling charging and discharging of each power storage element 11.

First Wire Routing Section 67

As illustrated in FIG. 3, the first housing section row 61 includes a first wire routing section 67 on a rear side of each of the first housing sections 60. The first wire routing section 67 extends in the left-right direction and has a groove shape opening upward. The voltage detection wire 16 is routed in the first wire routing section 67 and the voltage detection wire 16 is connected to the voltage detection terminal 22 that is arranged in the first housing section 60.

Second Wire Routing Section 68

The second housing section row 63 includes a second wire routing section 68 on a front side of each of the second housing sections 62. The second wire routing section 68 extends in the left-right direction and has a groove shape opening upward. The voltage detection wire 16 is routed in the second wire routing section 68 and the voltage detection wire 16 is connected to the voltage detection terminal 22 that is arranged in the second housing section 62.

Bridge Section 69

Bridge sections 69 are disposed between the first wire routing section 67 and the second wire routing section 68. The bridge section 69 includes a first bridge section 70 that extends rearward from the first wire routing section 67 and a second bridge section 71 that extends frontward from the second wire routing section 68. A rear end portion of the first bridge section 70 and a front end portion of the second bridge section 71 are overlapped with respect to the front-rear direction and the upper-lower direction. The bridge section 69 has a groove shape opening upward and the voltage detection wire 16 is arranged therein. Accordingly, the voltage detection wire 16 that is arranged in the first wire routing section 67 can be routed to the second wire routing section 68 and the voltage detection wire 16 that is arranged in the second wire routing section 68 can be routed to the first wire routing section 67.

Linking Section 64

As illustrated in FIG. 2, the position of the first housing section 60 included in the first housing section row 61 is shifted from the position of the second housing section 62 included in the second housing section row 63 with respect to the left-right direction. In this embodiment, two second housing sections 62 that are arranged in the left-right direction are disposed behind one first housing section 60 so as to overlap the one first housing section 60 with respect to the front-rear direction.

Figure 4:
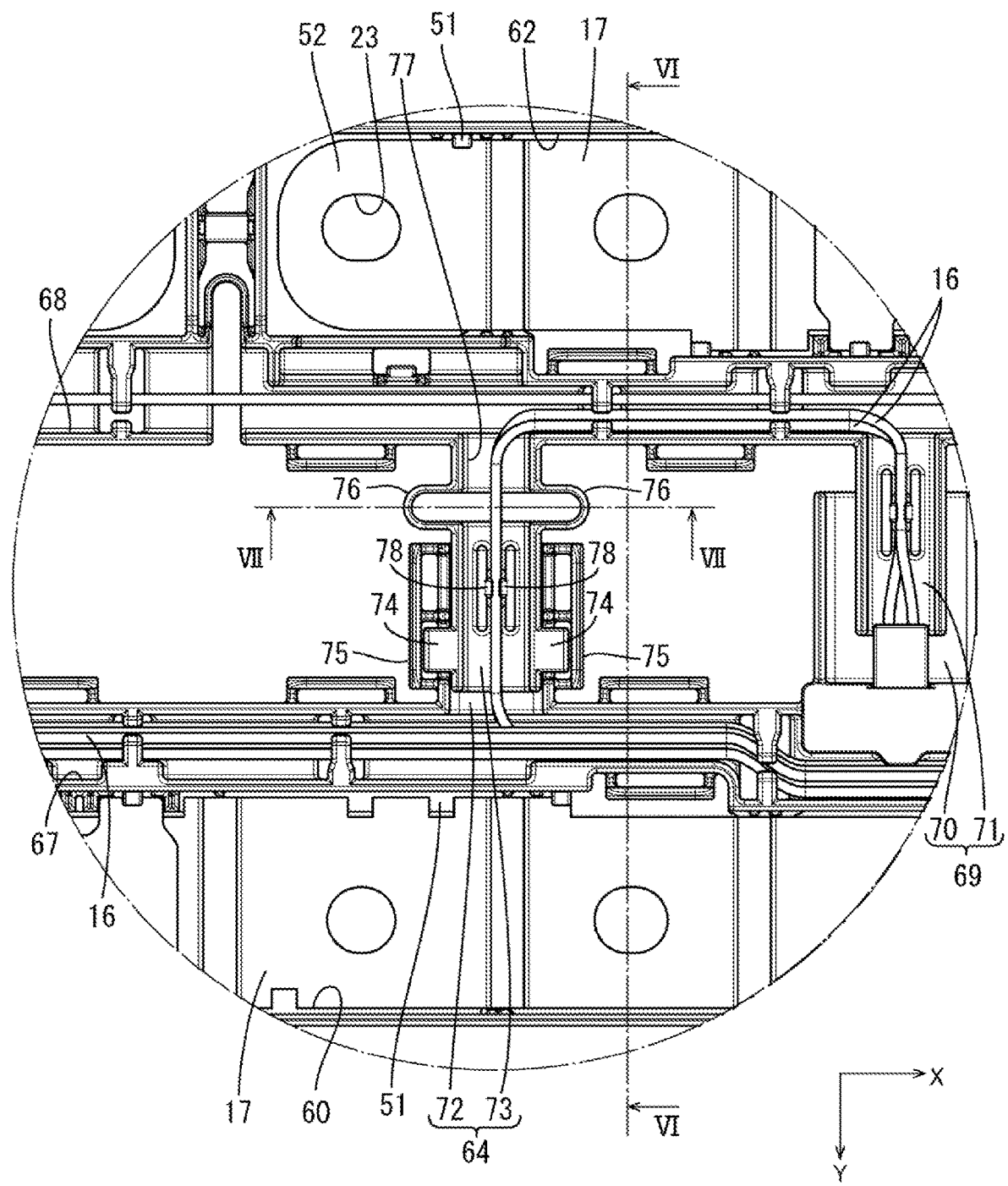
FIG. 4 is an enlarged plan view illustrating a portion surrounded by a chain line in FIG. 2.
Figure 6:
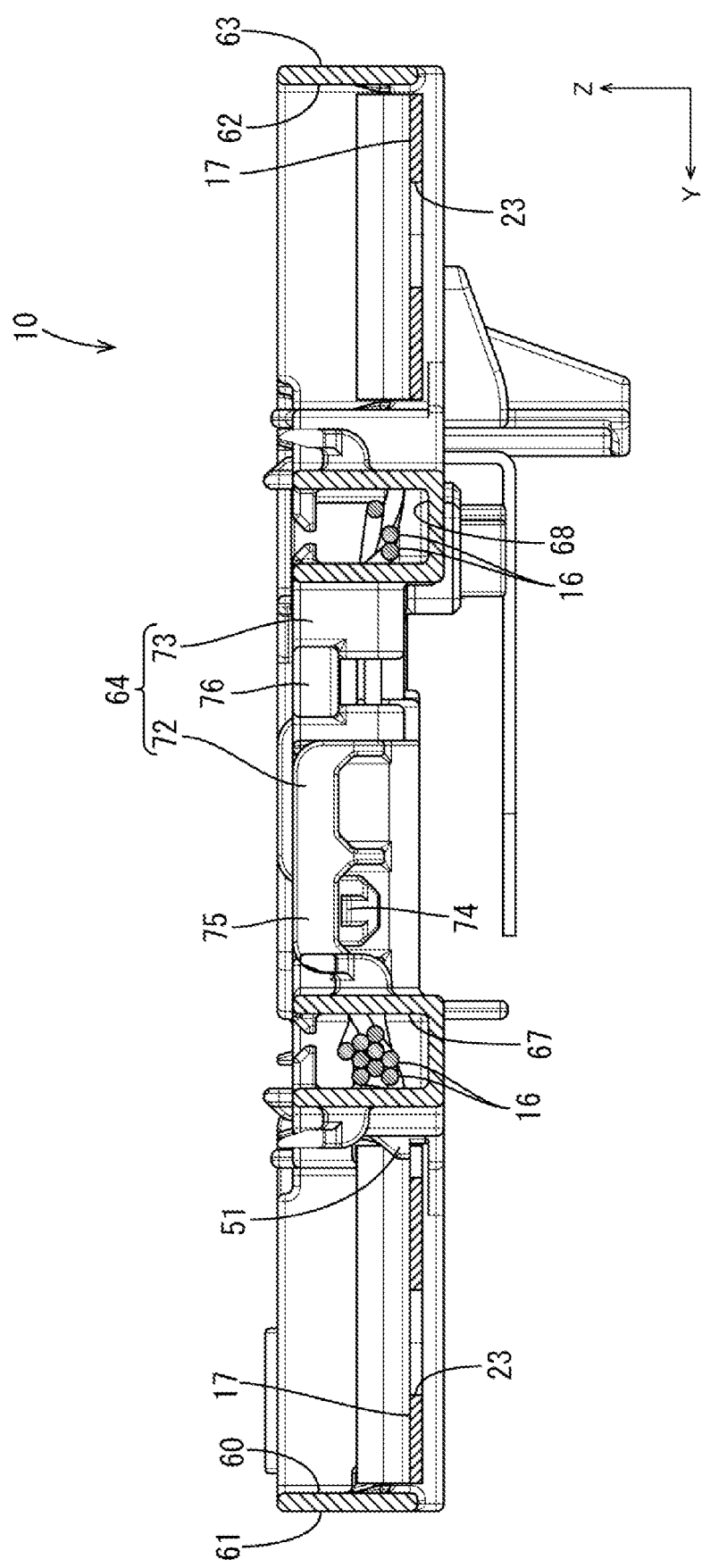
FIG. 6 is a cross-sectional view taken along VI-VI line in FIG. 4.

As illustrated in FIG. 4, the first housing section row 61 and the second housing section row 63 are linked by the linking sections 64 that are disposed between the first housing section row 61 and the second housing section row 63 and extend in the front-rear direction. The linking section 64 includes a first linking section 72 that extends rearward from a rear wall of the first housing section row 61 and a second linking section 73 that extends frontward from a front wall of the second housing section row 63. As illustrated in FIG. 6, a locking portion 74 of the second linking section 73 is elastically fitted to a locking receiving portion 75 of the first linking section 72 and the first linking section 72 and the second linking section 73 are integrally fitted to each other.

Figure 5:
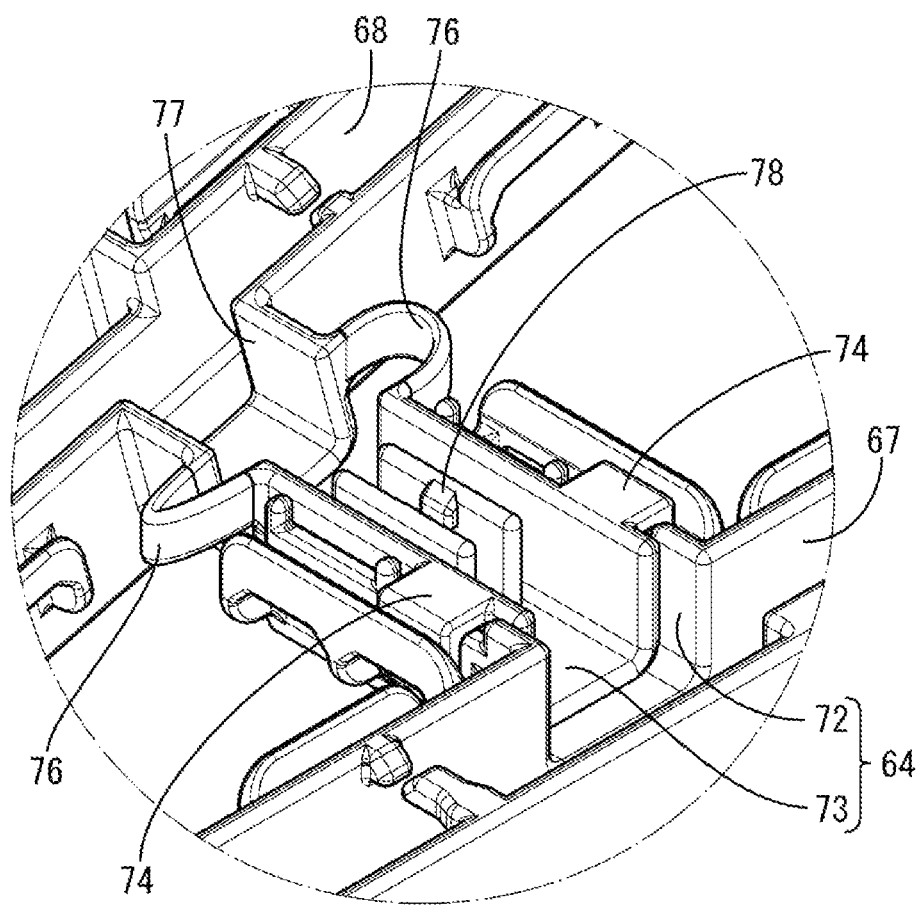
FIG. 5 is an enlarged perspective view illustrating a deformation portion that is deformed with twisting.
Figure 7:
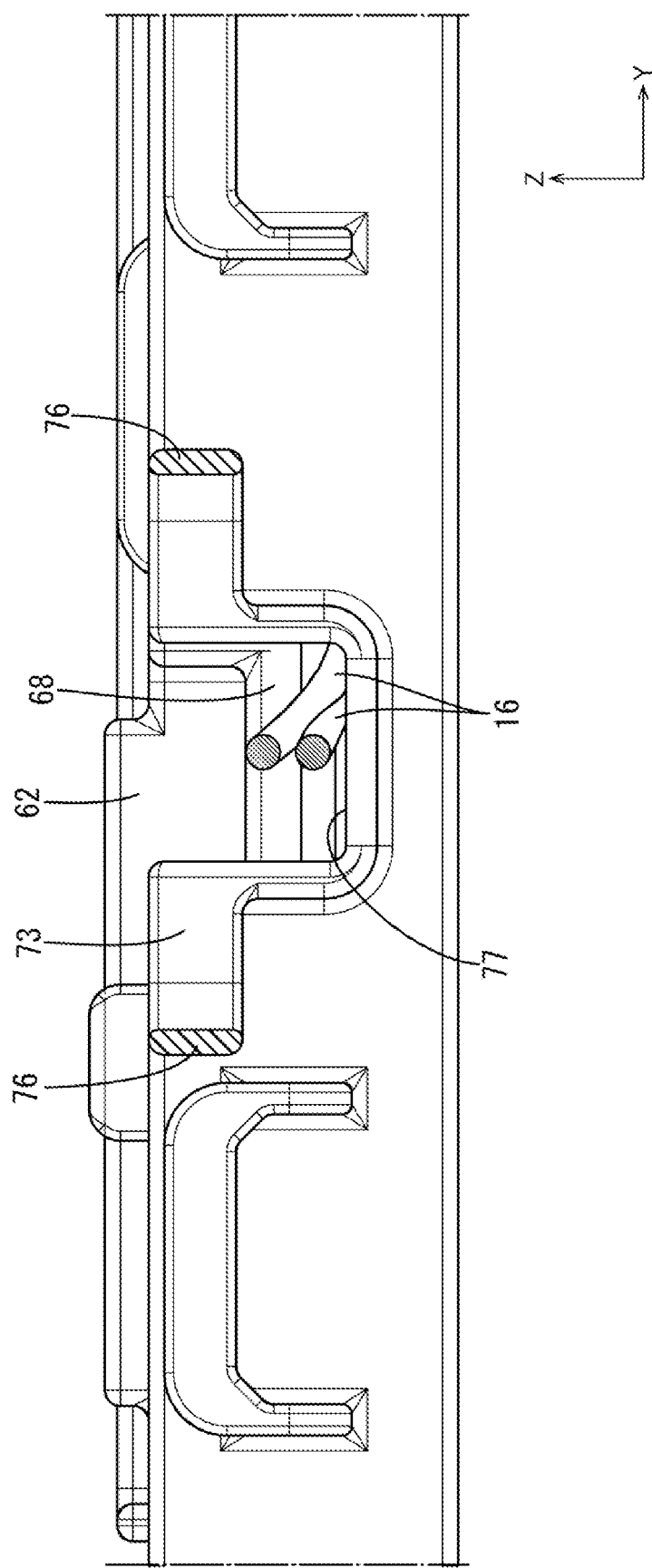
FIG. 7 is a cross-sectional view taken along VII-VII line in FIG. 4.

As illustrated in FIG. 7, the second linking section 73 has a thin plate shape and includes a pair of deformation portions 76 that projects in the left-right direction from the second linking section 73. The deformation portion 76 has a U-shape seen from the above. The deformation portion 76 is deformable with twisting about an axis along the front-rear direction. As illustrated in FIG. 5, the deformation portions 76 of the linking section 64 are deformed with twisting about the axis along the front-rear direction such that the wiring module 10 can be deformed with warping upward (in the direction crossing the electrode surface 41). The deformation portions 76 can be deformed with warping with respect to the plate thickness direction so as to expand and to be contracted with respect to the front-rear direction.

The first linking section 72 and the second linking section 73 have a groove shape opening upward. The first linking section 72 and the second linking section 73 that are fitted together with the locking portion 74 and the locking receiving portion 75 define an in-between routing section 77 in the linking section 64. The in-between routing section 77 has a groove shape opening upward. The voltage detection wire 16 is routed in the in-between routing section 77. The in-between routing section 77 allows the voltage detection wire 16 arranged in the first wire routing section 67 to be routed to the second wire routing section 68 and the voltage detection wire 16 arranged in the second wire routing section 68 to be routed to the first wire routing section 67. Accordingly, the voltage detection wire 16 can be routed freely in the wiring module 10.

As illustrated in FIGS. 4 and 5, the in-between routing section 77 includes wire stopper portions 78 that project to be opposite each other. The wire stopper portions 78 suppress the voltage detection wire 16 from going out from the in-between routing section 77 toward the upper side. The wire stopper portions 78 that are in contact with the voltage detection wire 16 from the upper side hold the voltage detection wire 16 in the in-between routing section 77.

Operations and Advantageous Effects of the Present Embodiment

Next, operations and advantageous effects of the present embodiment will be described. The wiring module 10 according to the present embodiment is to be mounted on the power storage element group 12 including the power storage elements 11 that are arranged in the arrangement direction. The power storage elements 11 include the electrode surfaces 41, respectively, on which the respective electrode terminals 14 are disposed. The wiring module 10 includes the connection bus bars 17, the output bus bars 18, the first housing section row 61, the second housing section row 63, and the linking sections 64. Each of the connection bus bars 17 and the output bus bars 18 is connected to one of the electrode terminals 14. The first housing section row 61 includes the first housing sections 60 in which the respective connection bus bars 17 are arranged and that are arranged in the arrangement direction. The second housing section row 63 includes the second housing sections 62 in which the connection bus bars 17 and the output bus bars 18 are arranged, respectively, and that are arranged in the arrangement direction. The second housing section row 63 is disposed away from the first housing section row 61 with respect to the crossing direction that crosses the arrangement direction. The linking sections 64 are disposed between the first housing section row 61 and the second housing section row 63 to link the first housing section row 61 and the second housing section row 63. The first housing sections 60 are linked together by the first warping sections 65 that are deformable with warping and the second housing sections 62 are linked together by the second warping sections 66 that are deformable with warping. Each of the linking sections 64 includes the deformation portions 76 that are deformable with twisting.

According to the above configuration, the first warping sections 65 are deformed with warping such that the first housing section row 61 can be warped in the direction crossing the electrode surface 41 of the power storage element 11. The second warping sections 66 are deformed with warping such that the second housing section row 63 can be warped in the direction crossing the electrode surface 41 of the power storage element 11. The deformation portions 76 of the linking sections 64 are deformed with twisting such that the warping deformation of the first housing section row 61 and the warping deformation of the second housing section row 63 do not interfere with each other. Accordingly, the wiring module 10 can be easily deformed with warping as a whole in the direction crossing the electrode surface 41.

According to the present embodiment, the deformation portions 76 are able to expand and to be contracted in the crossing direction.

According to the above configuration, the deformation portions 76 are contracted or expand in the crossing direction to deal with tolerance for a distance between the first housing section row 61 and the second housing section row 63.

According to the present embodiment, each of the connection bus bars 17 and the output bus bars 18 includes three or more connection sections 52 that are to be connected to the electrode terminals 14, respectively.

The connection bus bar 17 and the output bus bar 18 each of which includes three or more connection sections 52 are longer than a bus bar including two connection sections 52 with respect to the arrangement direction. Since the connection bus bars 17 and the output bus bars 18 are made of metal, the connection bus bars 17 and the output bus bars 18 cannot be warped in the direction crossing the electrode surface 41. Therefore, with the configuration in which the wiring module 10 includes the connection bus bars 17 and the output bus bars 18 each of which includes three or more connection sections 52, the wiring module 10 is hardly warped in the direction crossing the electrode surface 41. The present invention is particularly effective for such a configuration.

According to the present embodiment, the position of one of the first housing sections 60 is shifted from the position of one of the second housing sections 62 with respect to the arrangement direction and the one of the second housing sections 62 is adjacent to the one of the first housing sections 60 in the crossing direction.

According to the above configuration, the position where the one first housing section 60 is to be deformed with warping in the direction crossing the electrode surface 41 and the position where the one second housing section 62 is to be deformed with warping in the direction crossing the electrode surface 41 are shifted from each other with respect to the arrangement direction. The wiring module 10 may be less likely to be deformed with warping as a whole in the direction crossing the electrode surface 41. According to the technology described herein, the wiring module 10 can be easily deformed with warping as a whole in the direction crossing the electrode surface 41.

According to the present embodiment, each of the linking sections 64 includes the in-between routing section 77 in which the voltage detection wire 16 is arranged.

According to the above configuration, since the voltage detection wire 16 is routed in the in-between routing section 77, the voltage detection wire 16 can be routed in both of the first housing section row 61 and the second housing section row 63. This allows the voltage detection wire 16 to be routed more freely in the wiring module 10.

In the present embodiment, each of the linking sections 64 includes the wire stopper portions 78 that hold the voltage detection wire 16 so as not to let the voltage detection wire 16 go out from the in-between routing section 77.

According to the above-described configuration, the voltage detection wire 16 is less likely to go out from the in-between routing section 77. The linking sections 64 can be deformed with twisting at the deformation portions 76 and this may let the voltage detection wire 16 go out more easily. Therefore, the above configuration is particularly effective.

Other Embodiments

The technology disclosed herein is not limited to the embodiment described above and illustrated in the drawings. For example, the following embodiments will be included in the technical scope of the technology.

(1) The power storage element 11 may be a capacitor.

(2) In the present embodiment, three adjacent power storage elements 11 that are connected in parallel configure a group and two adjacent groups of the power storage elements 11 are connected in series. However, the connection configuration is not limited to the above one and two adjacent power storage elements 11 that are connected in parallel may configure a group or four or more adjacent power storage elements 11 that are connected in parallel may configure a group. The adjacent power storage elements 11 may be connected in series.

(3) In the present embodiment, the linking section 64 includes the in-between routing section 77. However, the in-between routing section 77 may be included in a position different from the linking section 64.

(4) In the present embodiment, the connection bus bar 17 includes six through holes 23. However, the configuration is not limited to the above one. The connection bus bar may include two to five through holes or seven or more through holes.

(5) In the present embodiment, the connection bus bar 17 includes the through holes 23. However, the configuration is not limited to the above one and the connection bus bar 17 may have no through holes. In such a configuration, the connection bus bar 17 may be connected to the electrode terminals 14 with welding or soldering.

(6) The number of the power storage elements 11 included in the power storage element group 12 may be any number.

(7) In the present embodiment, the voltage detection wire 16 is used as the electric wire. However, the electric wire is not limited to the voltage detection wire 16. An electric wire that is connected to a thermistor for detecting temperatures of the power storage element 11 or an electric wire that is connected to other device may be used as the electric wire.

(8) In the present embodiment, the linking section 64 includes the first linking section 72 and the second linking section 73 that are integrally fitted to each other. However, the configuration of the linking section is not limited to the above one. The linking section 64 may be molded integrally with the first housing section row 61 and the second housing section row 63.

EXPLANATION OF SYMBOLS

10: wiring module
11: power storage element
12: power storage element group
14: electrode terminal
16: voltage detection wire (one example of an electric wire)
17: connection bus bar (one example of a bus bar)
18: output bus bar (one example of the bus bar)
41: electrode surface
52: connection section
60: first housing section
61: first housing section row
62: second housing section
63: second housing section row
64: linking section
65: first warping section
66: second warping section
76: deformation portion
77: in-between routing section
78: wire stopper portion

The invention claimed is:

1. A wiring module to be mounted on a power storage element group including power storage elements that are arranged in an arrangement direction and have electrode surfaces having electrode terminals thereon, the wiring module comprising:
- bus bars each of which is connected to at least one of the electrode terminals;
- a first housing section row including first housing sections that are arranged in the arrangement direction and include the bus bars therein, respectively;
- a second housing section row including second housing sections that are arranged in the arrangement direction and include the bus bars therein, respectively, and the second housing section row being disposed away from the first housing section row with respect to a crossing direction that crosses the arrangement direction; and
- linking sections disposed between the first housing section row and the second housing section row and linking the first housing section row and the second housing section row, wherein the first housing sections are connected by a first warping section that can be deformed with warping and the second housing sections are connected by a second warping section that can be deformed with warping, and each of the linking sections includes a deformation portion that can be deformed with twisting.

2. The wiring module according to claim 1, wherein the deformation portion can be contracted and expand in the crossing direction.

3. The wiring module according to claim 1, wherein each of the bus bars includes three or more connection sections that are to be connected to the electrode terminals.

4. The wiring module according to claim 1, wherein a position of one first housing section of the first housing sections is shifted from a position of one second housing section of the second housing sections with respect to the arrangement direction and the one second housing section is adjacent to the one first housing sections in the crossing direction.

5. The wiring module according to claim 1, wherein each of the linking sections includes an in-between routing section in which an electric wire is routed.

6. The wiring module according to claim 5, wherein each of the linking sections includes a wire stopper portion that holds the electric wire to suppress the electric wire from going out from the in-between routing section.

* * * * *